(12) United States Patent
Meyer et al.

(10) Patent No.: US 8,905,350 B2
(45) Date of Patent: Dec. 9, 2014

(54) STRUCTURAL PANEL WITH INTEGRATED STIFFENING

(75) Inventors: Cedric Meyer, Fonsorbes (FR); Jocelyn Gaudin, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 337 days.

(21) Appl. No.: 13/162,920

(22) Filed: Jun. 17, 2011

(65) Prior Publication Data

US 2012/0009372 A1 Jan. 12, 2012

(30) Foreign Application Priority Data

Jun. 18, 2010 (FR) .................................. 10 54861
Jul. 2, 2010 (FR) .................................. 10 55402

(51) Int. Cl.
  *B64C 1/00* (2006.01)
  *B29D 99/00* (2010.01)
  *B64C 1/08* (2006.01)
  *B29L 31/30* (2006.01)

(52) U.S. Cl.
  CPC ............. *B64C 1/08* (2013.01); *B29D 99/0014* (2013.01); *B29L 2031/3082* (2013.01)
  USPC .......................................... 244/119; 244/120

(58) Field of Classification Search
  USPC .................................................. 244/119, 120
  See application file for complete search history.

(56) References Cited

U.S. PATENT DOCUMENTS

| | | | | |
|---|---|---|---|---|
| 2,827,412 A | * | 3/1958 | McKay ............................ | 428/60 |
| 4,086,378 A | * | 4/1978 | Kam et al. .................... | 428/34.5 |
| 4,496,412 A | * | 1/1985 | Ritter ............................. | 156/157 |
| 5,622,733 A | * | 4/1997 | Asher ............................ | 425/504 |
| 5,871,117 A | * | 2/1999 | Protasov et al. .............. | 220/592 |
| 6,068,902 A | * | 5/2000 | Vasiliev et al. .............. | 428/36.3 |
| 6,284,089 B1 | * | 9/2001 | Anderson et al. ........... | 156/304.3 |
| 6,350,115 B1 | * | 2/2002 | Sloman ......................... | 425/389 |
| 6,458,309 B1 | * | 10/2002 | Allen et al. ................... | 264/319 |
| 7,897,239 B2 | * | 3/2011 | Koon et al. ................... | 428/116 |
| 2007/0095982 A1 | * | 5/2007 | Kismarton et al. ........... | 244/119 |
| 2009/0277994 A1 | * | 11/2009 | Lobato et al. ................ | 244/119 |

FOREIGN PATENT DOCUMENTS

DE 1921 798 2/1971

OTHER PUBLICATIONS

French Preliminary Search Report issued Feb. 9, 2011, in French 1054861, filed Jun. 18, 2010 (with English Translation of Category of Cited Documents).

* cited by examiner

*Primary Examiner* — Tien Dinh
*Assistant Examiner* — Justin Benedik
(74) *Attorney, Agent, or Firm* — Oblon, Spivak, McClelland, Maier & Neustadt, L.L.P.

(57) ABSTRACT

A stiffened panel including at least one stiffener, known as a longitudinal stiffener, extending substantially from one extremity of the panel to another and whose trace on a surface of the panel follows a path having non-zero geodesic curvature between the two extremities of the stiffener. This configuration makes it possible to optimize both a stiffness of the panel and its resistance to the force flow to which the panel is subjected to during operation by minimizing its mass through an optimum definition of an orientation of the stiffeners relative to the force flow.

12 Claims, 3 Drawing Sheets

STRUCTURAL PANEL WITH INTEGRATED STIFFENING

The invention relates to the field of structural panels, more specifically, but not exclusively, to the field of aircraft fuselage panels. The invention is more specifically intended for the field of structural panels made of a fiber reinforced composite material.

An aircraft fuselage consists mainly of stiffened panels assembled to form said fuselage. Such panels each cover an area of a few square meters of the fuselage and comprise at least one curvature corresponding to the radius of the fuselage. On an airplane, the panels located in the front (cockpit) and rear portions of the fuselage generally comprise two, possibly variable, curvatures. The radii of curvature range from several meters in the transverse direction of the fuselage to several tens of meters in the longitudinal direction.

Such panels consist of a skin, whose thickness is less than $1/100^{th}$ of the largest dimension of the panel; this skin is stiffened by longitudinal stiffeners, known as stringers, extending substantially parallel to the longitudinal axis of the fuselage, i.e. along the lesser curvature of the panel, and radial stiffeners, called frames, placed in planes perpendicular to the longitudinal axis of the aircraft.

Consequently, the stiffening of the panel is realized along these two preferred directions, the aircraft's longitudinal axis and the plane perpendicular to this axis, the stiffening structure thus describing a set of curvilinear rectangles, or mesh. Similarly, all other components of the structure follow this mode of stiffening.

This is advantageous in manufacturing terms, particularly when these panels are made of metallic materials, as it makes it possible to manufacture the stiffeners and skin separately and then assemble the two, thus minimizing scraps and machining operations. According to this mode of stiffening, the stiffeners follow a geodesic curve between their two extremities at the surface of the panel, thereby making it easier to manufacture them from rectilinear sections. In fact, in images, a geodesic curve on a surface corresponds to the path of an observer moving over said surface by walking straight ahead. Such a path, which corresponds to a straight line on a plane, is said to have a zero geodesic curvature.

In the case of a panel made of a fiber reinforced composite material, according to prior art, the stiffeners are also placed according to geodesics on the panel. This also makes it possible to manufacture the stiffeners and skin separately and then assemble them easily by co-curing or bonding.

However, the forces to which these panels are subjected in operation do not follow these preferred directions of the stiffeners. With respect to a mesh, the designer can only adjust the thickness of the skin or modify the sections of stiffeners that are poorly oriented, relative to the force observed. It is therefore common to find locally stiffening greater than what is strictly required and thus a structural mass significantly greater than the theoretical optimum. This situation is particularly disadvantageous in areas subjected to shear stress such as the lateral fuselage panels and the upper and lower surface wing panels.

To remedy the deficiencies of the prior state of the art, the invention proposes a stiffened panel comprising at least one stiffener, known as a longitudinal stiffener, extending substantially from one extremity of the panel to the other; the trace on the surface of said panel follows a path having non-zero geodesic curvature between the two extremities of said stiffener.

As the stiffener's trace on the surface of the panel has non-zero geodesic curvature, it does not follow a geodesic direction of the surface, unlike in the prior state of the art.

Thus, the direction of the stiffener can be optimized according to other criteria than ease of manufacture. This type of panel is particularly advantageous when a panel is curved, and more specifically has a double curvature in which at least one of the curvatures is non-zero.

Said panel can comprise a longitudinal stiffener on one of its surfaces or both.

Such a panel can be manufactured by machining an initially shaped thick plate, the portions outside the stiffeners being reduced by cutting so as to bring their thickness to the skin's thickness. However, such a panel will be advantageously constituted of a composite material with fiber reinforcement. This constitution enables other manufacturing processes for said stiffener such processes allowing said panel to be manufactured in a cost-efficient manner, by the addition of material, locally reinforcing the panel so as to form the stiffener, which is then integrated into the panel, and not mounted as in the prior state of the art. This construction principle allows a multiple stress path as opposed to the mounted stiffener, in which the skin/stiffener interface is a weak point that must frequently be reinforced by fasteners.

According to a particular embodiment the stiffeners are formed by the local superposition of plies. This superposition can be realized by covering edges of pre-cut plies while laying up the panel or by locally depositing additional plies. These two techniques can even be combined by interposing reinforcements between the overlays. In all cases, advantageously the capabilities of digitally controlled layup or fiber placement machines can be used to manufacture these panels in a cost-efficient manner. Furthermore, this embodiment avoids any risk of the stiffener becoming delaminated.

Advantageously, the panel also comprises a continuous ply on its inner surface and a continuous ply on its outer surface. The presence of these continuous plies avoids the stiffeners' risks of tear-out by peeling and promotes dissipation of the forces throughout the panel's entire volume.

According to this embodiment, the stiffener is advantageously formed by covering the edges of plies during layup with at least one interposed ply between the overlaid plies. These interposed plies allow the height, and therefore the inertia, of the stiffeners to be increased.

Advantageously, the trace of the longitudinal stiffeners on the panel's surface follows a path able to provide maximum stiffening with respect to the stresses they are subjected to in operation.

The trace of the stiffener on the panel's surface is defined by projecting the curve connecting the centers of inertia of sections of the stiffener on said surface parallel to the local rectifying plane of said curve.

Thus, the local stiffness is optimized with respect to the force flow to which the panel is subjected. In every point the stiffening is close to just what is necessary, which allows the mass of the panel to be reduced for an equivalent strength and stiffness.

The invention will now be described more precisely in the context of preferred non-limiting embodiments shown in FIGS. 1 to 8 in which:

FIG. 1 shows a fuselage section in perspective according to the prior state of the art;

FIG. 2, also relating to the prior state of the art, shows an example of a longitudinal stiffener in perspective and the position of the rectifying plane on this stiffener;

Figure 1:
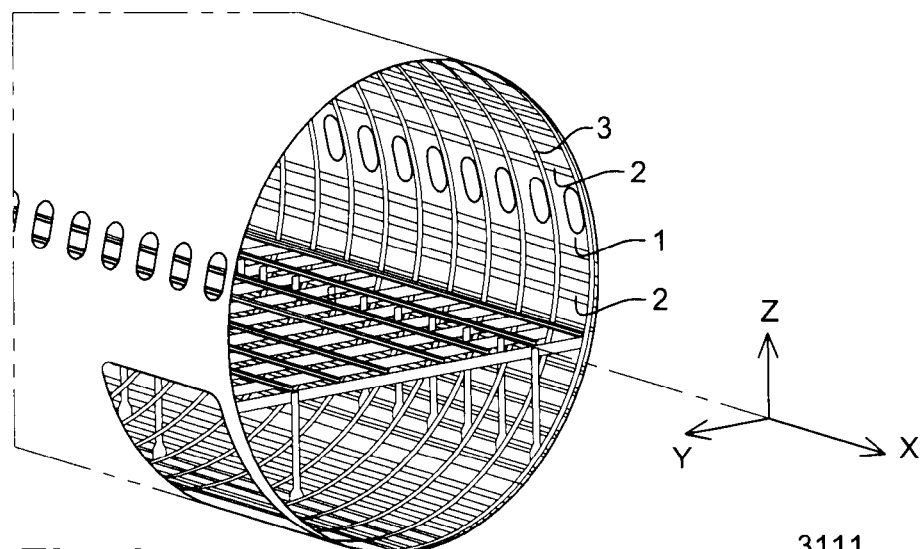

FIG. 1: according to the prior state of the art, an aircraft fuselage section comprises a skin (1) made of a metal or composite sheet. Said skin is stiffened by longitudinal stiffeners (2), also known as stringers, in the form of profiles extending substantially parallel to the longitudinal axis X of the fuselage and circumferential stiffeners (3), also known as frames, extending by following the skin in sections perpendicular to the longitudinal axis X. The assembly of a skin (1) with stiffeners (2, 3) forms a stiffened panel (10).

Figure 2:
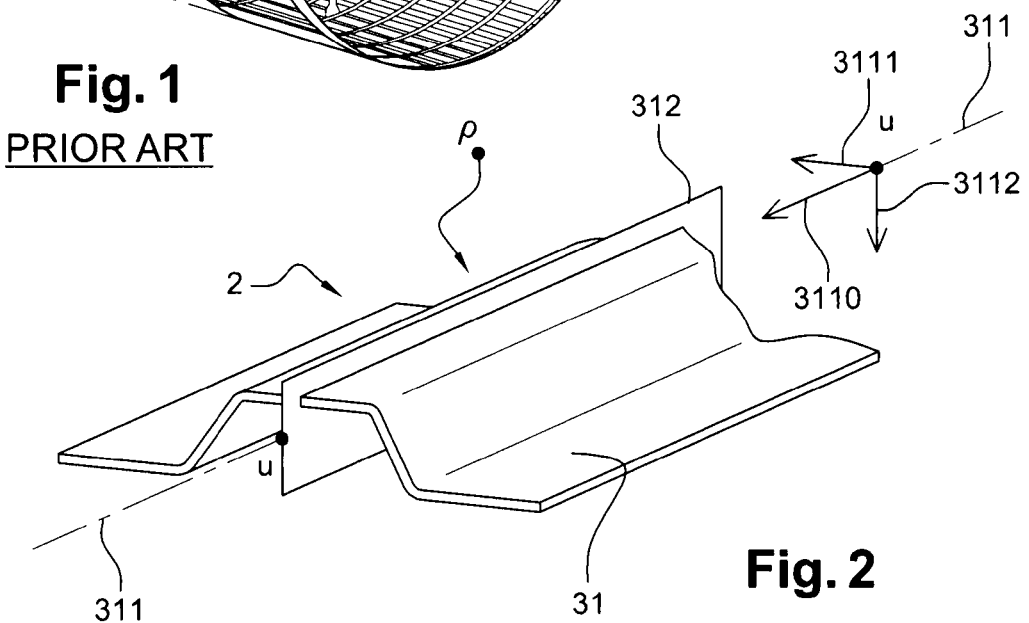

FIG. 2: a longitudinal stiffener (2) is shown in the form of a profile which has a substantially constant cross-section, which can nevertheless be reinforced locally; said section is commonly '2'- or T-shaped when said profile is made of a metallic material, or T- or omega-shaped when it is made of a composite. According to the prior state of the art, this profile is manufactured according to a rectilinear shape and mounted on the panel. During this assembly, or before it, said stiffener can undergo shaping by drawing, rolling, local stamping or shot peening, if it is metallic, by hot stamping or during co-curing or bonding with the panel, if it is made of a composite material; this shaping is designed to adapt its shape to the bearing surface on the skin, the stiffener being linked to it by its base (31). The general shape of said stiffener can be defined after forming by the curve (311) connecting the centers of inertia of its cross-sections along said stiffener. When it has a constant cross-section, this curve is a straight line for the stiffener before forming; it becomes a curve after forming. At each point of this curve a reference space, known as a Frenet reference space, can be defined, which includes the tangent (3110) to the curve (311) at this point 'u' and the principal normal (3111) to the curve at the same point. The tangent and principal normal define a particular plane, known as the osculating plane, of the curve at the point 'u' in question and the bi-normal (3112) perpendicular to the other two, which is in fact oriented towards the base of the stiffener (31) and thus to the skin (1) of the stiffened panel. The plane formed at each point 'u' of the curve (311) by the tangent (3110) and the bi-normal (3112) is called the rectifying plane (312).

According to the prior state of the art, the shaping of the stringer (2) consists of giving it a curvature based on a radius p substantially parallel to the bi-normal (3112) and, where necessary, a twist by twisting around the main axis (311) so that it follows the panel's shape.

Figure 3:
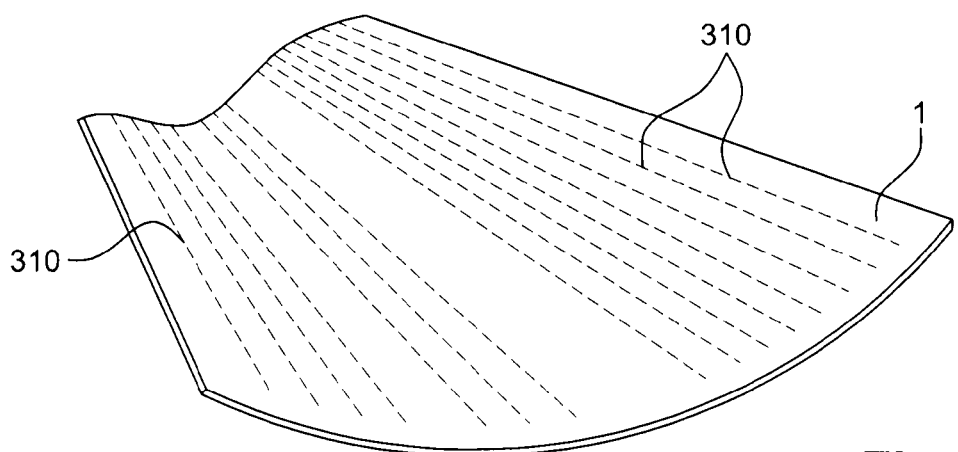
FIG. 3 illustrates in perspective the track of the stiffeners on the panel's surface according to the prior state of the art.

FIG. 3: on a stiffened panel (10), the track of the stiffeners (310), for example in the case of longitudinal stiffeners (2), is defined by the intersection between the rectifying plane of the stringers and the inner or outer surface of the skin (1). According to the prior state of the art, the stringers follow a geodesic trace (310) on the surface of the skin (1), from one extremity to the other. That is to say that any shaping operation gives them a curvature and a twist equal to the curvature of the panel (10) between these two endpoints. With respect to the surface of the skin (1), the trace of such a stiffener follows a trajectory with zero geodesic curvature, i.e. a geodesic curve. If the panel has a single curvature, the tracks are straight lines. According to the prior state of the art, the same is true for the frames (3), whose traces on the surface of the skin (1) also substantially follow geodesic curves between their extremities and which, if the panel has a single curvature, follow circles or ellipses in a plane YZ of the fuselage.

Figure 4:
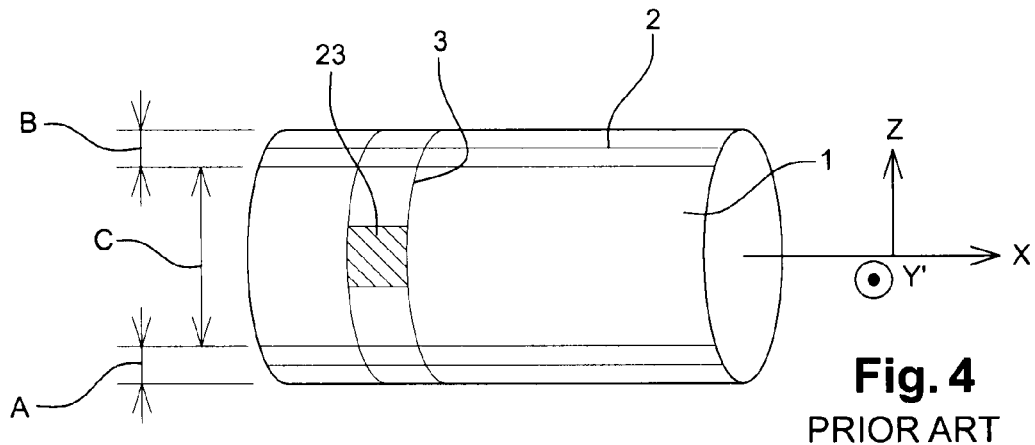
FIG. 4 is a schematic view of the stiffening principle for a fuselage section according to the prior state of the art.

FIG. 4: the method of positioning stiffeners according to the prior state of the art produces strengthening in the fuselage based on substantially rectangular meshes (23). These meshes withstand different types of force flows according to their position. Thus, in flight, the lower portion of the fuselage (A) is primarily subjected to compression along the longitudinal axis X of the fuselage; this compression is mainly borne by the stringers (2). The upper portion (B) is mainly subjected to tension stress; this tension is also borne by the stringers (2). In the intermediate portion (C) the stress is a shear stress withstood jointly by the stringers (2) and the frames (3).

Figure 5:
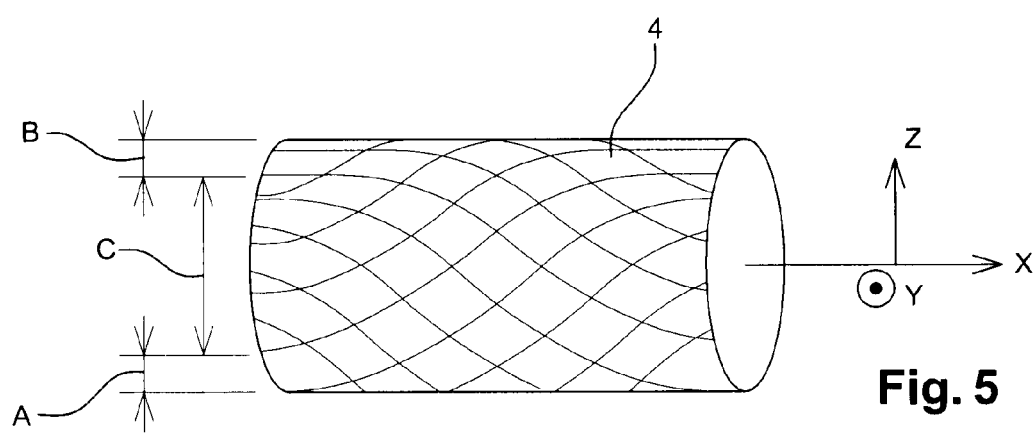
FIG. 5 is a schematic view of the stiffening principle for a fuselage section according to an embodiment of the invention.

FIG. 5: according to an embodiment of the invention, the stiffeners (4) are not arranged according to geodesic traces, but are locally oriented optimally relative to the force flow. Thus, in the lower (A) and upper (B) portions of the fuselage they are oriented substantially parallel to the longitudinal axis X of the fuselage so as to provide the maximum stiffening against tension/compression stresses. Their orientation gets progressively closer to 45° as they get closer to the center of the fuselage in the intermediate zone (C), so as to provide the maximum stiffening against shear stresses. With this optimized stiffening mode, the stress to which the frames are subjected lessens and their cross-section and therefore mass can be reduced considerably.

Figure 6:
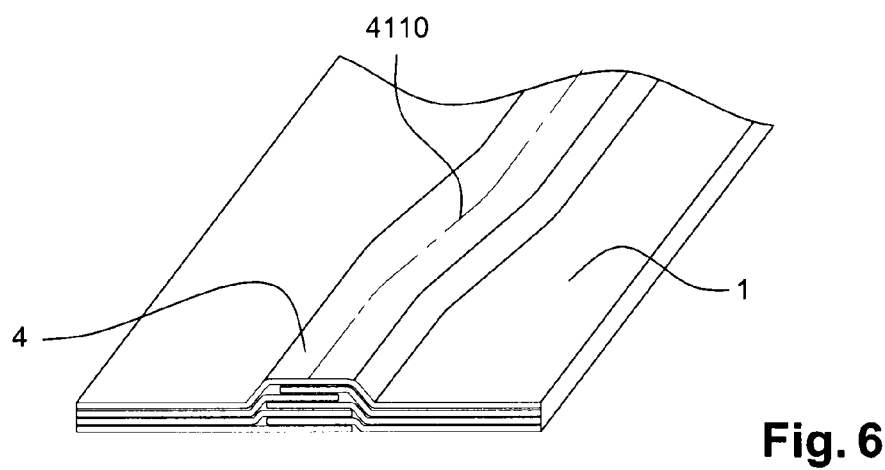
FIG. 6 illustrates in a top perspective view an embodiment of the stiffeners at the surface of a panel.

FIG. 6: according to this embodiment, at the surface of the skin (1) the stiffener (4) no longer follows a geodesic between its two extremities; instead it follows a trace (4110) having non-zero geodesic curvature. This embodiment is more specifically suited to stiffened panels (10) made of a composite material.

Figure 7:
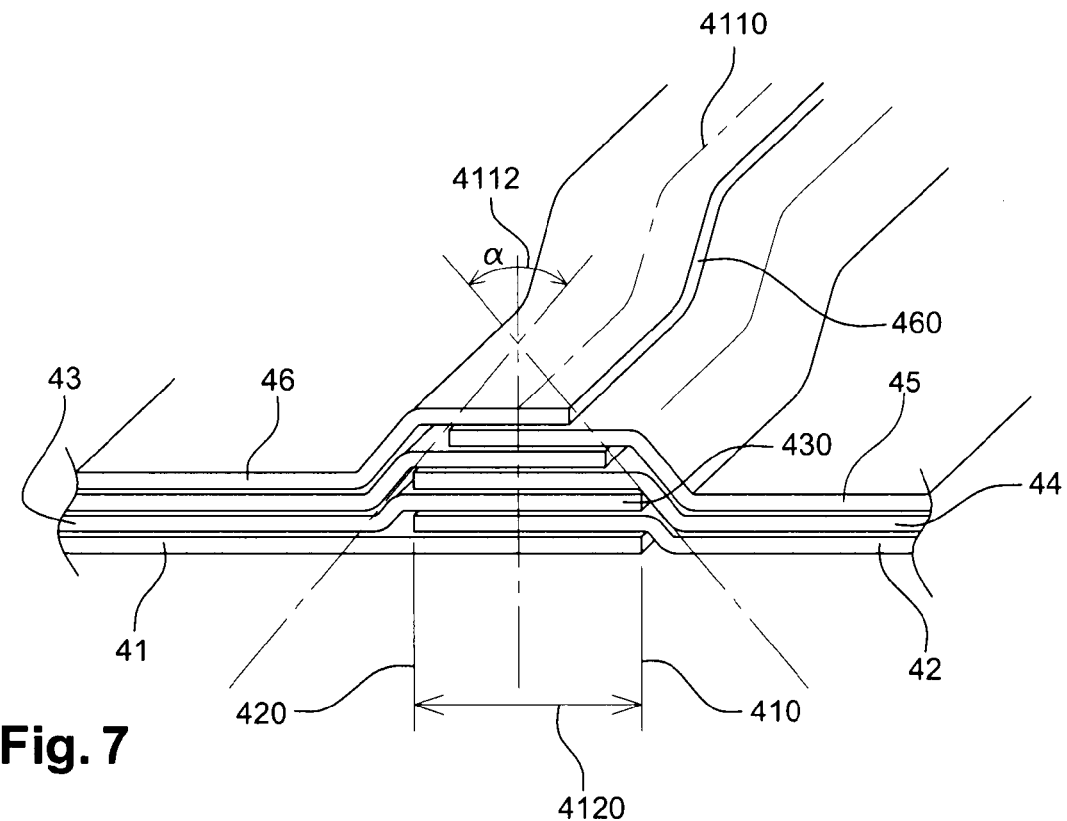
FIG. 7 is an end-on perspective view of a panel according to an embodiment made of a composite, showing the superposition of the plies.

FIG. 7: according to this embodiment, the curved stiffeners (4) made of a composite material can be formed during layup of the panel by local superposition of plies, via automatic tape laying on a digitally controlled machine. A preform of the panel is then made by successively laying up dry fiber or pre-impregnated unidirectional or woven tapes according to a predefined deposition sequence and orientation. Alternatively, or locally for complex stiffener contours, the fibers can be deposited by fiber placement.

The preform is then cured or consolidated under pressure in the respective cases of fibers pre-impregnated with thermosetting resin or thermoplastic resin, or follows a molding method with resin injection in the case of a dry preform, according to conventional methods known of the person skilled in the art.

According to this layup method, a first ply (41) is laid up, its edge (410) following a contour parallel to the desired trace (4110), which has been determined by calculation, for example, according to the force flow to which the panel is subjected in operation. A second ply (42) is laid up so that its edge (420) overlays the edge (410) of the first ply (41) over an overlay length (4120) substantially centered on the track (4110) of the stiffener. A third ply (43) is laid up over the first (41) so that its edge (430) overlays the edge (420) of the second ply (42). A fourth ply (44) whose edge just covers the edge (430) of the third ply and so on so that successive overlays create an overthickness that forms the stiffener. The length of successive overlays, always centered on the trace (4110) of the stiffener, decreases with each overlay so that the edges of successive plies are offset by a slope angle $\alpha/2$ relative to the bi-normal (4112) at the trace of the stiffener. Advantageously, $\alpha$ is between 20° and 60°. These angles allow a gradual transfer of loads between the superimposed plies and thus avoid a mode of damage by the delamination of portions of superimposed plies.

Also advantageously, the minimum overlay distance between two plies is 15 mm.

To avoid damage by the peeling of discontinuous outer plies (46, 41) it is advantageous to cover both sides of the panel with continuous plies.

Figure 8:
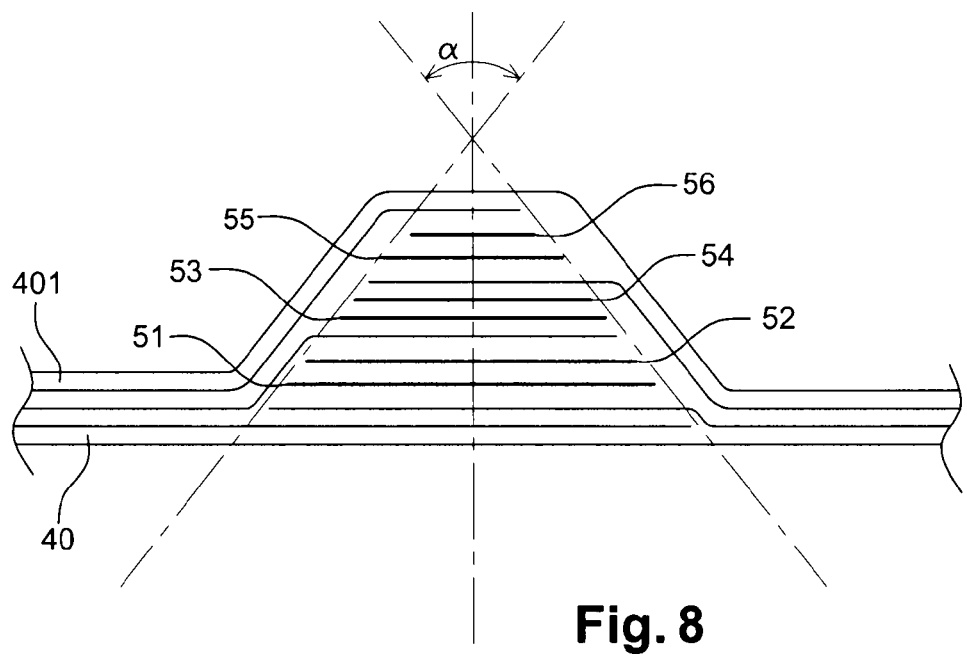
FIG. 8 is an end-on cross-section view of a composite panel according to an embodiment of the invention by overlaying discontinuous plies and intermediate reinforcing plies.

FIG. 8: the panel is thus covered on each side by continuous plies (40, 401). Moreover, according to a particular embodiment, internal reinforcement plies (51, 52, 53, 54, 55, 56) are placed between the overlays. These reduced-width plies are advantageously laid up by fiber placement. They can provide additional inertia to the stiffener when the number of plies needed for the skin is not sufficient to achieve this inertia by simple overlay.

Advantageously, the internal reinforcement plies have a width of at least 10 mm and must be entirely covered by overlays of discontinuous plies (41, 42, 43, 44, 45, 46). A maximum of 5 internal reinforcement plies may be placed between the overlay of two discontinuous plies.

According to a particular embodiment (not shown), a single panel can comprise stiffeners formed by overlaying plies on each of its faces. According to another particular embodiment (not shown) the same panel can comprise both stiffeners formed by superimposing plies and mounted stiffeners.

The above description clearly illustrates that through its various features and their advantages the present invention realizes the objectives it set itself. In particular, it makes it possible to optimize both the panel's stiffness and its resistance to the force flow to which it is subjected in operation by minimizing its mass through an optimum definition of the orientation of the stiffeners relative to said force flow.

The invention claimed is:

1. A stiffened panel comprising:
a skin; and
at least one stiffener, known as a longitudinal stiffener, extending substantially from one extremity of the panel to another extremity of the panel on a first face of the panel,
wherein a trace of the longitudinal stiffener on a surface of the skin follows a path having a non-zero geodesic curvature between the one extremity and the another extremity of the panel,
wherein the longitudinal stiffener includes a plurality of plies, each of the plurality of plies including a first ply segment offset from a second ply segment in a direction perpendicular to the trace of the longitudinal stiffener,
wherein the first ply segment includes an edge following a contour of the trace of the longitudinal stiffener,
wherein an edge of a second ply of the plurality of plies overlays an edge of a first ply of the plurality of plies over a first overlay length substantially centered on the trace of the longitudinal stiffener,
wherein an edge of a third ply of the plurality of plies overlays the edge of the second ply of the plurality of plies over a second overlay length substantially centered on the trace of the longitudinal stiffener, and
wherein an edge of a fourth ply of the plurality of plies overlays the edge of the third ply of the plurality of plies over a third overlay length substantially centered on the trace of the longitudinal stiffener.

2. The stiffened panel according to claim 1, wherein the shape of the longitudinal stiffener exhibits a double curvature in which at least one curvature is non-zero.

3. The stiffened panel according to claim 1, wherein the panel comprises a longitudinal stiffener on a second face of the panel.

4. The stiffened panel according to claim 1, wherein said panel is made of a fiber reinforced composite material.

5. The stiffened panel according to claim 4, wherein the plurality of plies of the longitudinal stiffener are superimposed.

6. The stiffened panel according to claim 5, wherein the panel includes a continuous ply on an inner surface of the panel and a continuous ply on an outer surface of the panel.

7. The stiffened panel according to claim 6, wherein edges of the plurality of plies are covered with at least one interposed ply between overlaid plies.

8. An aircraft comprising a fuselage having a longitudinal axis, in which a section is subjected in flight to compression stress in a zone known as a lower zone and traction stress in a zone known as an upper zone substantially symmetrical to the lower zone relative to the longitudinal axis and comprising an intermediate zone, located between the lower zone and upper zone, which is subjected to shear stress, wherein the aircraft comprises the stiffened panel according to claim 1.

9. The aircraft according to claim 8, wherein the stiffened panel comprises a longitudinal stiffener which, at the surface of the skin of said panel, follows a path substantially parallel to the longitudinal axis of the fuselage in the lower zone and the upper zone of said fuselage, so as to provide a maximum stiffening against traction and compression stresses, and follows a path that progressively changes to a 45° orientation as the longitudinal stiffener gets closer to the intermediate zone of the fuselage, so as to provide a maximum stiffening against shear stresses.

10. The stiffened panel according to claim 1, wherein a minimum overlay distance of successive plies of the plurality of plies is 15 mm.

11. The stiffened panel according to claim 1, wherein edges of successive plies of the plurality of plies are offset by a slope angle of $\alpha/2$ relative to a bi-normal of the trace of the longitudinal stiffener.

12. The stiffened panel according to claim 11, wherein $\alpha$ is between 20° and 60°.

* * * * *